United States Patent [19]

Porta

[11] Patent Number: 4,546,798

[45] Date of Patent: Oct. 15, 1985

[54] VACUUM INSULATED FLUID TRANSPORT PIPES AND METHOD OF CONSTRUCTION

[75] Inventor: Paolo D. Porta, Milan, Italy

[73] Assignee: S.A.E.S. Getters S.p.A., Milan, Italy

[21] Appl. No.: 487,910

[22] Filed: Apr. 22, 1983

[30] Foreign Application Priority Data

May 30, 1982 [IT] Italy .............................. 21395 A/82

[51] Int. Cl.[4] .............................................. F16L 9/18
[52] U.S. Cl. .............................. 138/149; 138/DIG. 6; 445/31
[58] Field of Search ..................... 138/147, 148, 149; 228/184; 252/181.6; 445/55, 31

[56] References Cited

U.S. PATENT DOCUMENTS

| | | | |
|---|---|---|---|
| 291,655 | 1/1884 | Walsh | 138/148 |
| 3,408,130 | 10/1968 | Fransen | 445/55 |
| 3,926,832 | 12/1975 | Barosi | 252/181.6 |
| 4,088,456 | 5/1978 | Giorgi et al. | 55/179 |
| 4,146,497 | 3/1979 | Barosi | 252/181.6 |

FOREIGN PATENT DOCUMENTS 637588 12/1978 U.S.S.R. .............................. 138/149

Primary Examiner—Kenneth J. Ramsey
Attorney, Agent, or Firm—Quaintance & Murphy

[57] ABSTRACT

A vacuum insulated fluid transfer pipeline section and its method of manufacture are described. To maintain the vacuum, use is made of a non-evaporable getter material capable of the permanent sorption of active gases and the reversible sorption of hydrogen.

3 Claims, 8 Drawing Figures

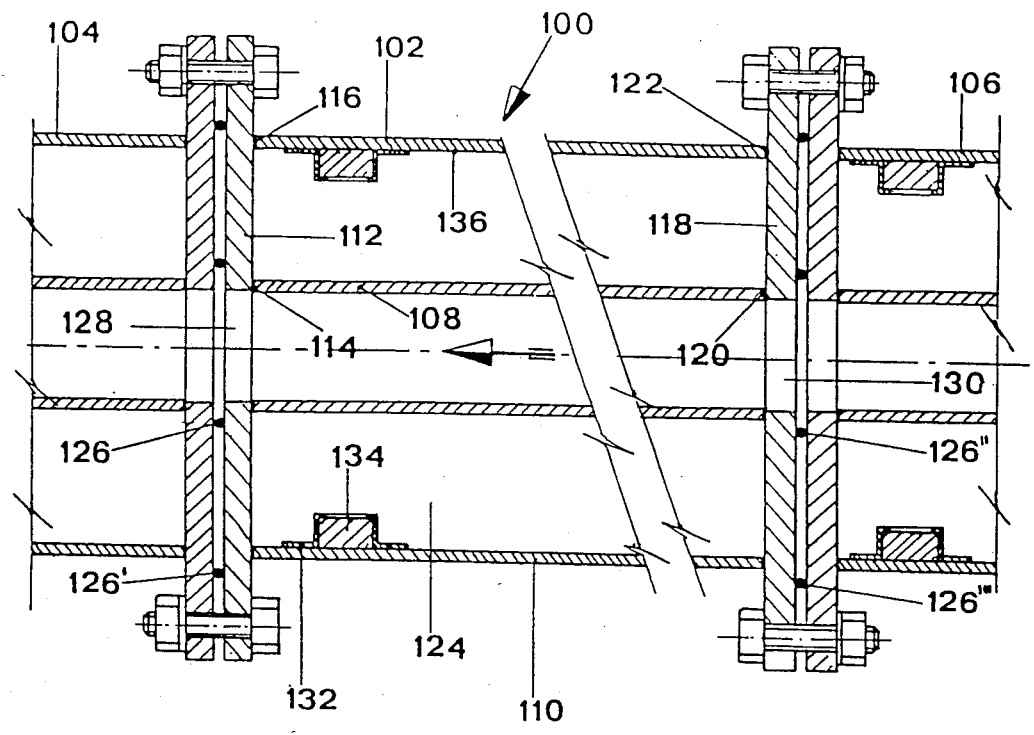
FIG. 1
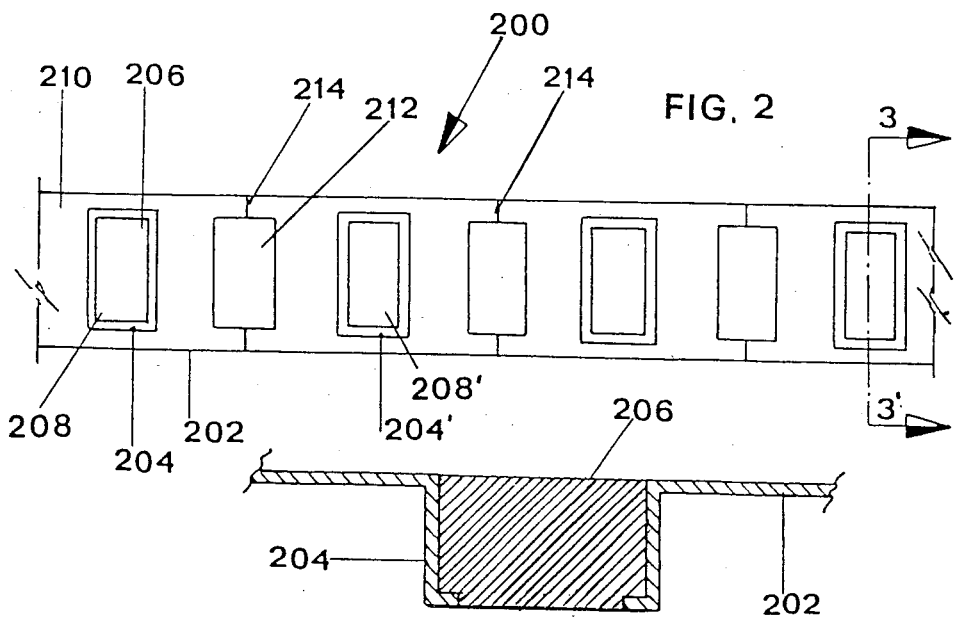
FIG. 2
FIG. 3

VACUUM INSULATED FLUID TRANSPORT PIPES AND METHOD OF CONSTRUCTION

BACKGROUND

It is very often desirable to transfer a fluid, whose temperature differs from that of the ambient, from one location to another with a minimum of heat exchange between the fluid and the ambient.

For instance, warm petroleum gas and/or liquid may have to be pumped through pipes situated in arctic conditions. An excessive reduction of the fluids' temperature causes an increase of its viscosity to such an extent that it becomes difficult or impossible to pump economically. There is also the risk that if the pipe passes through permafrost zones these zones can be melted with subsequent loss of their mechanical support function.

District heating employs the transportation of heated water from a central source, such as a power station or geothermal area, to a whole community of users which may be situated at some distance from the source.

Chemical processing often requires the transport of fluids at very high temperatures during their transformation into an end product.

The economics of these processes depend, among other factors, on the extent to which heat losses can be prevented or at least minimized.

Another case in which heat exchange between a fluid being transported in a pipeline and the ambient must be reduced as much as possible is in the transport of cryogenic or liquified gases. Such cryogenic liquids may be being used for instance to cool superconducting electrical power lines or magnets or may even serve as a fuel in rocket propulsion.

Whatever the nature or purpose of the fluid, some form of thermal insulation must be provided around the pipe which transports the fluid.

Layers of thermally insulating material, such as foamed plastic, asbestos or glass fibre, have been proposed, but they can easily become impregnated with moisture and lose their insulating properties. Their mechanical resistance is very poor, and they can very easily be damaged during transport or rough handling.

It has been proposed that vacuum be used as an insulating medium. This can be accomplished by the use of two concentric tubes in which the inner tube is used to transport the fluid and the jacket space between the inner and outer tubes is evacuated. See, for instance, U.S. Pat. No. 1,140,633. While the use of vacuum insulation has proved very effective in considerably reducing heat exchange between the transported fluid and the external ambient, it has proved difficult to maintain the vacuum at a sufficiently low pressure to maintain its integrity of the insulation for a sufficiently long time. If the evacuated volume has a residual gas pressure of greater than about $10^{-4}$ torr $(1.3\times10^{-2}Pa)$-$10^{-3}$ torr $(1.3\times10^{-1}Pa)$, the thermal exchange between the inner and outer walls due to conduction and convection becomes significant. Continuous outgassing from the surfaces in contact with the vacuum causes the pressure to rise and eventually destroy the insulating properties of the structure. In theory, it would be possible to re-evacuate the space at intervals of time, but this involves additional labour costs and very often the pipelines are situated in remote and inaccessible locations, such as arctic tundra, or they are buried underground.

It has been proposed to place zeolites within the vacuum space as, for instance, in U.S. Pat. No. 3,369,826, in an attempt to maintain the required degree of vacuum, as it is well known that zeolites are capable of sorbing gas. Unfortunately, zeolites must be cooled to cryogenic temperatures in order for them to have an appreciable gas sorbing action. In addition, water vapour is preferentially sorbed by zeolites, which prematurely inhibits their sorption of other gases. Upon heating from the cryogenic temperatures, the sorbed gases are released.

Charcoal and PdO have also been suggested in U.S. Pat. No. 3,992,169, but PdO is capable of sorbing $H_2$ only. Furthermore, palladium is expensive.

It is, therefore, necessary to provide some means for continuously maintaining a vacuum within the inter-pipe space for long periods of time without the necessity of human intervention or the use of automatic, and expensive, additional equipment.

Care must also be tkaen that any heating of the tubes does not cause metallurgical phase changes which would alter their physical or mechanical properties.

OBJECTS OF THE INVENTION AND BRIEF DESCRIPTION OF THE DRAWINGS

It is, therefore, an object of the present invention to provide a more efficient and reliable fluid transfer pipeline section and a method of manufacturing it free from one or more of the disadvantages or previously known fluid transfer pipeline sections.

It is a further object of the present invention to provide a vacuum insulated fluid transfer pipeline section in which a satisfactory degree of vacuum is maintained for substantial periods of time by the use of a getter material capable of the permanent sorption of active gases and the reversible sorption of hydrogen.

Yet a further object of the present invention is to provide a fluid transfer pipeline section and method for its manufacture which does not cause metallurgical phase changes of the metals used in its construction.

These and other objects and advantages of the present invention will become apparent by reference to the following description and drawings wherein:

FIG. 1 is a cross-section of part of three vacuum insulated fluid transfer pipeline sections of the present invention;

FIG. 2 is a plan view of a getter device useful in the present invention;

FIG. 3 is an enlarged cross-sectional view taken along Line 3—3' of FIG. 2;

DETAILED DESCRIPTION OF THE DRAWINGS AND INVENTION

Figure 4:
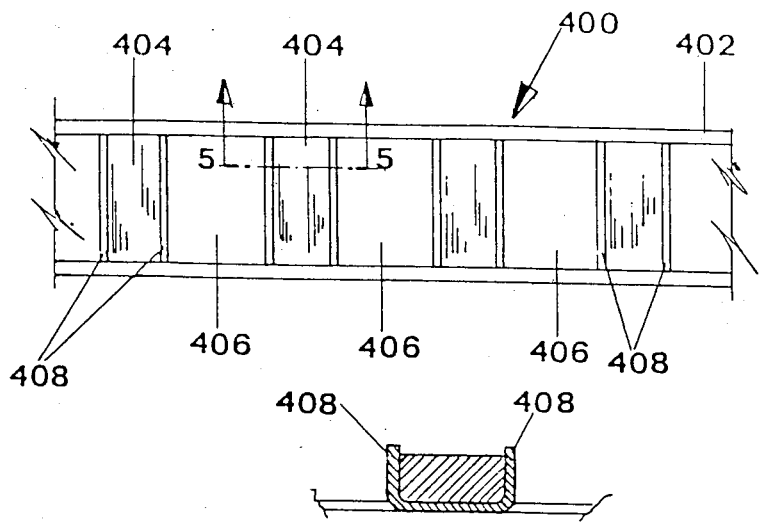
FIG. 4 is a plan view of another getter device useful in the present invention.

Referring now to the drawings and in particular to FIG. 1, there is shown an assembly 100 comprising part of a first fluid pipeline section 102 whose ends are attached to similar sections 104, 106. In the embodiment shown, pipeline section 102 comprises an inner metal tube 108 in the form of a cylinder and a substantially coaxial outer metal tube 110 again in the form of a cylinder. A first joining means in the form of a metal flange 112 is welded to first adjacent ends 114, 116 of inner and outer tubes 108, 110 respectively in a vacuum tight manner. A second joining means in the form of a metal flange 118 is welded to second adjacent ends 120, 122 of the inner and outer cylindrical tubes 108, 110 respectively in a vacuum tight manner.

This structure defines an enclosed volume 124 or jacket which can be evacuated through a valve (not shown) or by other means to be described later. First and second flange joining means 112, 118 can be bolted to similar flanges on additional pipeline sections 104, 106 respectively in a fluid tight manner. In the embodiment shown, gaskets 126, 126', 126'', 126''' ensure the fluid tight nature of the section-section connection. Flanges 112, 118 are provided with central holes 128, 130 respectively of a diameter approximately equal to the inside diameter of inner tube 108. This allows continuous fluid flow through the inner metal tube. A getter device 132, containing a non-evaporable getter material 134 which can permanently sorb active gases and reversibly sorb hydrogen, is in thermal contact with a wall within said jacket 124, in this case with inner wall 136 of outer metal tube 110.

The getter device can be in any suitable form for maintaining thermal contact with a wall within the jacket, such as individual pellets or as a powder directly attached to the wall using binders. A continuous strip of metal with the getter powder compression bonded to one or both surfaces of the strip can also be used.

A preferred form of getter device 200 is shown in FIGS. 2 and 3 which comprises a continuous running length of thin metal strip 202. Depressions 204, 204', etc., are made at regular intervals in the strip and are filled with non-evaporable getter material 206, thus providing getter material support zones 208, 208', etc. The areas 210 of the metal strip between adjacent support zones can be provided with slits 212, if desired, to provide alternate bending zones 214. These permit easy contouring of the strip to conform to the curved surface of the jacket walls while still maintaining adequate thermal contact.

Figure 5:
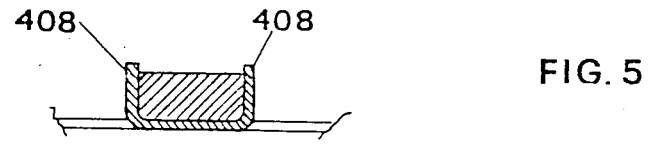
FIG. 5 is a cross-sectional view taken along Line 5—5' of FIG. 4.

FIGS. 4 and 5 show another preferred embodiment 400 of a getter device for use in the present invention. In a continuous running length of thin metal strip 402, the getter material support zones 404 utilize the strip material of the bending zones 406 to form the walls 408 of each support zone 404.

Figure 7:
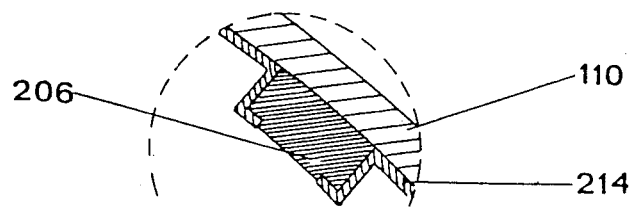
FIG. 7 is an enlargement of a portion of FIG. 6 showing a detail of part of a nonevaporable getter device used in the present invention.
Figure 6:
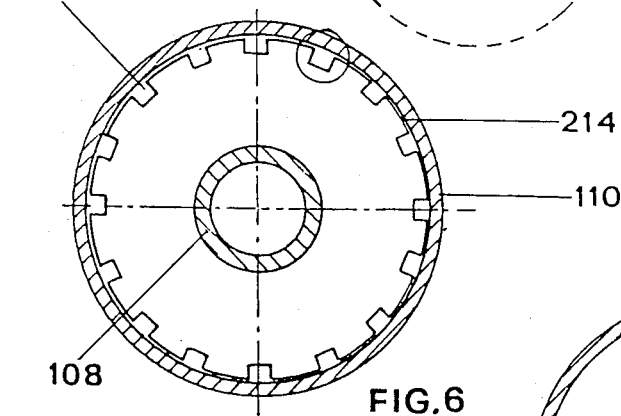
FIG. 6 is an end view of a vacuum insulated fluid transfer pipeline section during its manufacture.
Figure 8:
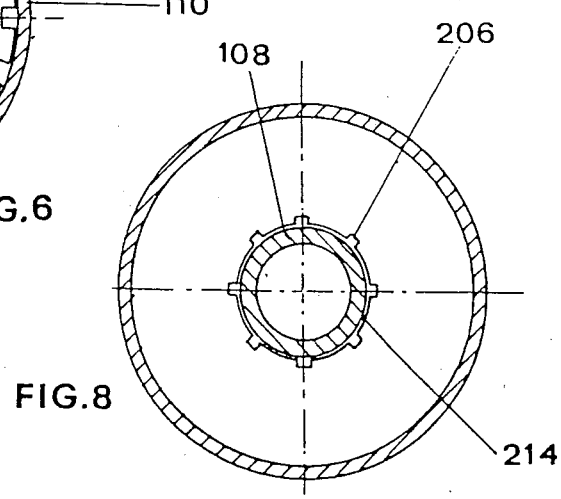
FIG. 8 is an end view of another vacuum insulated fluid transfer pipeline during its manufacture.

In use, the required length of strip is cut and placed in contact with a wall within the jacket as shown in FIGS. 6, 7 and 8 where the same numbers as used in FIGS. 1–3 represent like parts.

The getter material used is any non-evaporable getter material capable of the permanent sorption of active gases and the reversible sorption of hydrogen. Preferably, the non-evaporable getter material is chosen from the group comprising:
(a) an alloy of zirconium with aluminum in which the weight percent of aluminium is from 5–30%;
(b) a partially sintered mixture of carbon powder with at least one metal powder selected from the group consisting of Zr, Ta, Hf, Nb, Ti, Th and U, the carbon powder being present in up to 30% by weight;
(c) a partially sintered mixture of
  (i) a particulate Zr-Al alloy comprising 5–30 weight percent Al; balance Zr, and
  (ii) at least one particulate metal powder selected from the group consisting of Zr, Ta, Hf, Nb, Ti, Th and U;
(d) a powdered alloy of Zr-V-Fe whose composition in weight percent, when plotted on a ternary composition diagram in weight percent Zr, weight percent V and weight percent Fe, lies within a polygon having as its corners the points defined by:
  (i) 75% Zr - 20% V - 5% Fe
  (ii) 45% Zr - 20% V - 35% Fe
  (iii) 45% Zr - 50% V - 5% Fe;
(e) a partially sintered mixture of
  (i) at least one particulate metal chosen from the group consisting of Ti and Zr, and
  (ii) a powdered alloy of Zr-V-Fe whose composition in weight percent, when plotted on a ternary composition diagram in weight percent Zr, weight percent V and weight percent Fe, lies within a polygon having as its corners the points defined by:
  (i) 75% Zr - 20% V - 5% Fe
  (ii) 45% Zr - 20% V - 35% Fe
  (iii) 45% Zr - 50% V - 5% Fe.

It will be realized that the pipeline segment is preferably furnished with expansion means to accommodate differences in thermal expansion or contraction between the inner and outer pipes and that the flanges or segment joining means may be designed to minimize thermal conduction between the fluid and the external ambient, but these aspects do not form part of the present invention.

In manufacturing a fluid transfer pipeline section of the present invention, a first end of an inner metal tube and an adjacent first end of a substantially coaxial outer metal tube are attached by welding to a first joining means in a vacuum-tight manner. The tubes are preferably cylindrical, and the joining means is preferably a flange suitable for joining in a fluid-tight manner to an additional pipeline section in such a way as to be able to allow continuous fluid flow through the inner tube. In the space between the inner and outer metal tubes, there is inserted a non-evaporable getter device which may conveniently be in the form of a thin metal strip supporting the getter material as herein previously described.

If the pipeline is intended for the transport of warm or hot fluids, it is convenient to place the strip in thermal contact with the inner metal tube so that the getter material is maintained at a suitable temperature during fluid transport. The temperature of the fluid may even be sufficiently high to activate certain getter materials. This would be the case when the fluid is high pressure steam at a temperature of about 300°–450° C. whereby the non-evaporable getter is heated to approximately the same temperature. If the fluid to be transported is a cryogenic fluid, then the strip should be placed in thermal cntact with the outer metal wall so that the getter material is maintained at ambient temperatures during fluid flow.

After insertion of the getter device into the space between the inner and outer pipes, the second end of the inner metal tube and the second end of the outer metal tube are attached in a vacuumtight manner to a joining means which again is preferably a flange. The space between the inner and outer tubes is then evacuated to a pressure of less than $10^{-2}$ torr (1.3 Pa) and preferably less than $10^{-4}$ torr ($1.3 \times 10^{-2}$ Pa). While continuing to pump the jacket space, the pipeline section is heated to a temperature of greater than 150° C. and preferably about 250° C. This temperature should be maintained for a period of a few hours in order to degas the jacket surfaces. The jacket is then sealed and removed from the pumping system. If the gettering material is such that it activates at low temperatures, then the degassing process is also sufficient to activate it. If this temperature is not high enough to activate the getter material sufficiently, then the area of the pipe where the getter device is located can be heated from outside the jacket. This can be accomplished by any suitable means, such as playing a flame over the surface or by induction heating in the appropriate zones. If the surfaces of the pipes within the jacket have been plated with a metal such as zinc in order to have more highly reflective surfaces and, therefore, improve the jacket thermal insulation properties, the zones where the getter material is supported should preferably be left free from plating.

A preferred method of manufacturing the pipeline section is to perform most of the processing in a vacuum oven. A first end of an inner metal tube and an adjacent first end of a substantially coaxial outer metal tube are attached by welding to a first joining means in a vacuum-tight manner. The tubes are preferably cylindrical, and the joining means is preferably a flange suitable for joining in a fluid-tight manner to an additional pipeline section in such a way as to be able to allow continuous fluid flow through the inner tube. The tubes joined to the first joining means are then placed in a vacuum oven together with a second joining means. If the getter material can be sufficiently activated under the temperature-time conditions used for degassing the tubes in the vacuum oven, it is convenient to insert the getter into the space between the inner and outer tubes before placing the assembly in the vacuum oven. In this case, the getter device could be placed near the first joining means so that during the degassing evolved gases do not flow over the getter and do not substantially reduce its sorption capacity. If the getter material requires a relatively high activation temperature to make it capable of sorbing gas, then the getter device can be placed in the vacuum oven separate from the tubes and the second joining means. After evacuating the oven and heating the components contained therein to the degassing temperature, the getter device is separately heated to its activation temperature by suitable means, such as induction heating, and then placed in the space between the inner and outer tubes. At the end of the degassing, the second end of the inner metal tube and the second end of the outer metal tube are attached in a vacuumtight manner, for instance by electron beam welding, to a second joining means which again is preferably a flange. After joining the second flange to create a vacuum jacket, the pipeline section is allowed to cool and is removed from the vacuum oven.

Although the invention has been described in considerable detail with reference to certain preferred embodiments designed to teach those skilled in the art how best to practice the invention, it will be realized that other modifications may be employed without departing from the spirit and scope of the appended claims.

What is claimed is:

1. A fluid transfer pipeline section comprising an inner metal cylindrical tube, a substantially coaxial outer metal cylindrical tube, a first metal flange joining first adjacent ends of the inner and outer cylindrical tubes in a vacuum-tight manner, a second metal flange joining second adjacent ends of the inner and outer cylindrical tubes in a vacuum-tight manner thus defining an evacuated jacket, first and second flanges adapted for joining the pipeline section in a fluid-tight manner to additional pipeline sections and adapted to allow continuous fluid flow through the inner metal cylindrical tube wherein a getter device is in thermal contact with the inner wall of the outer cylindrical tube, said getter device comprising a thin metal strip provided with alternate bending zones and getter material support zones, said getter material being a non-evaporable getter material capable of the permanent sorption of active gases and the reversible sorption of hydrogen.

2. A method of manufacturing a fluid transfer pipeline section comprising the steps of:
(A) welding in a vacuum-tight manner a first end of a cylindrical inner metal tube and a first end of a cylindrical outer metal tube to a first flange adapted for joining the pipeline section in a fluid-tight manner to an additional pipeline section to allow continuous fluid flow through the cylindrical inner metal tube;
(B) inserting into the space between the inner and outer metal tubes and in thermal contact with the outer wall of the inner metal tube a nonevaporable getter device comprising a thin metal strip provided with bending zones and getter material support zones, said getter material being capable of the permanent sorption of active gases and the reversible sorption of hydrogen and which is chosen from the group consisting of:
   (a) an alloy of zirconium with aluminium in which the weight percent of aluminium is from 5-30%;
   (b) a partially sintered mixture of carbon powder with at least one metal powder selected from the group consisting of Zr, Ta, Hf, Nb, Ti, Th and U, the carbon powder being present in up to 30% by weight;
   (c) a partially sintered mixture of:
      (i) a particulate Zr-Al alloy comprising 5-30% weight percent Al, balance Zr; and
      (ii) at least one particulate metal powder selected from the group consisting of Zr, Ta, Hf, Nb, Ti, Th and U;
   (d) a powdered alloy of Zr-V-Fe whose composition in weight percent, when plotted on a ternary composition diagram in weight percent Zr, weight percent V and weight percent Fe, lies within a polygon having as its corners the points defined by:
      (i) 75% Zr - 20% V - 5% Fe
      (ii) 45% Zr - 20% V - 35% Fe
      (iii) 45% Zr - 50% V - 5% Fe
   (e) a partially sintered mixture of:
      (i) at least one particulate metal chosen from the group consisting of Ti and Zr, and
      (ii) a powdered alloy of Zr-V-Fe whose composition in weight percent, when plotted on a ternary composition diagram in weight percent Zr, weight percent V and weight percent Fe, lies within a polygon having as its corners the points defined by:
         (i) 75% Zr - 20% V - 5% Fe
         (ii) 45% Zr - 20% V - 35% Fe
         (iii) 45% Zr - 50% V - 5% Fe
(C) evacuating the space between the inner and outer metal tubes to a pressure less than $10^{-2}$ torr (1.3 Pa);
(D) heating the tubes to a temperature of greater than 150° C.;

(E) welding in a vacuum-tight manner the second end of the cylindrical inner metal tube and the second end of the cylindrical outer metal tube to a second flange adapted for joining in a fluid-tight manner to an additional pipeline section to allow continuous fluid flow through the cylindrical inner metal tube; and (F) heating the getter material to a temperature less than that at which phase changes take place in the metal of the inner cylindrical metal tube to render it capable of gas sorption;

wherein the inner surface of the outer metal tube and/or the outer surface of the cylindrical inner metal tube are metal plated with a reflective surface except in the getter material support zones.

3. A method of manufacturing a fluid transfer pipeline secton comprising the steps of:

(A) welding in a vacuum-tight manner a first end of a cylindrical inner metal tube and a first end of a cylindrical outer metal tube to a first flange adapted for joining the pipeline section in a fluid-tight manner to an additional pipeline section to allow continuous fluid flow through the cylindrical inner metal tube;

(B) inserting into the space between the inner and outer metal tubes and in thermal contact with the outer wall of the inner metal tube a non-evaporable getter device comprising a thin metal strip provided with bending zones and getter material support zones, said getter material being capable of the permanent sorption to active gases and the reversible sorption of hydrogen and which is chosen from the group consisting of:

(a) an alloy of zirconium with aluminium in which the weight percent of aluminium is from 5-30%;

(b) a partially sintered mixture of carbon powder with at least one metal powder selected from the group consisting of Zr, Ta, Hf, Nb, Ti, Th and U, the carbon powder being present in up to 30% by weight;

(c) a partially sintered mixture of:
  (i) a particulate Zr-Al alloy comprising 5-30% weight percent Al, balance Zr; and
  (ii) at least one particulate metal powder selected from the group consisting of Zr, Ta, Hf, Nb, Ti, Th and U;

(d) a powdered alloy of Zr-V-Fe whose composition in weight percent, when plotted on a ternary composition diagram in weight percent Zr, weight percent V and weight percent Fe, lies within a polygon having as its corners the points defined by:
  (i) 75% Zr - 20% V - 5% Fe
  (ii) 45% Zr - 20% V - 35% Fe
  (iii) 45% Zr - 50% V - 5% Fe;

(e) a partially sintered mixture of:
  (i) at least one particulate metal chosen from the group consisting of Ti and Zr, and
  (ii) a powdered alloy of Zr-V-Fe whose composition in weight percent, when plotted on a ternary composition diagram in weight percent Zr, weight percent V and wheight percent Fe, lies within a polygon having as its corners the points defined by:
  (i) 75% Zr - 20% V - 5% Fe
  (ii) 45% Zr - 20% V - 35% Fe
  (iii) 45% Zr - 50% V - 5% Fe (C) evacuating the space between the inner and outer metal tubes to a pressure less than $10^{-2}$ torr (1.3 Pa);

(D) heating the tubes to a temperature of greater than 150° C.; and (E) welding in a vacuum-tight manner the second end of the cylindrical inner metal tube and the second end of the cylindrical outer metal tube to a second flange adapted for joining in a fluid-tight manner to an additional pipeline section to allow continuous fluid flow through the cylindrical inner metal tube;

(F) passing steam at super atmospheric pressure at a temperature of about 300°-450° C. through the inner tube in order to heat the non-evaporable getter device to approximately the same temperature thereby activating it.

* * * * *